United States Patent [19]

Matsumoto et al.

[11] Patent Number: 4,474,587
[45] Date of Patent: Oct. 2, 1984

[54] PROCESS FOR THE TREATMENT OF WASTE GASES FROM A CHLORINATION FURNACE

[75] Inventors: Yoshimasa Matsumoto; Tadachika Mizuno; Hidehiro Sato, all of Chigasaki; Kenji Koyama, Hayamamachi, all of Japan

[73] Assignee: Toho Titanium Co., Ltd., Tokyo, Japan

[21] Appl. No.: 456,049

[22] PCT Filed: May 28, 1982

[86] PCT No.: PCT/JP82/00203
§ 371 Date: Dec. 29, 1982
§ 102(e) Date: Dec. 29, 1982

[87] PCT Pub. No.: WO82/04199
PCT Pub. Date: Dec. 9, 1982

[30] Foreign Application Priority Data

May 28, 1981 [JP] Japan .................................. 56-80066

[51] Int. Cl.³ ............................................ B01D 19/00
[52] U.S. Cl. .......................................... 55/71; 55/72
[58] Field of Search ........................ 55/71, 72, 74, 29; 423/491, 492, 72, 79

[56] References Cited

U.S. PATENT DOCUMENTS

| 242,368 | 5/1881 | Reynolds | 55/29 |
| 2,682,930 | 7/1954 | Krchma | 55/71 |
| 4,029,484 | 6/1977 | Fitzpatrick | 55/71 |

FOREIGN PATENT DOCUMENTS

| 142534 | 7/1980 | German Democratic Rep. | 55/71 |
| 76293 | 6/1977 | Japan | 55/71 |
| 30147 | 8/1977 | Japan | 55/71 |
| 1361519 | 7/1974 | United Kingdom . | |

Primary Examiner—Bernard Nuzick
Attorney, Agent, or Firm—Oblon, Fisher, Spivak, McClelland & Maier

[57] ABSTRACT

A waste gas exhausted from a chlorination furnace during the manufacture of titanium tetrachloride or zirconium tetrachloride which contains larger quantities of $CO_2$ and harmful substances such as chlorides and the like is subjected to treatment which comprises the sequential steps of scrubbing the waste gas in a water scrubbing column, removing moisture from the waste gas to allow the waste gas to have a dew point of no more that 5° C., and adsorbing the waste gas in an activated carbon packed column. The process is capable of reducing the content of chlorides in the waste gas to a level of no more than 5 ppm in HCl equivalent.

14 Claims, No Drawings

PROCESS FOR THE TREATMENT OF WASTE GASES FROM A CHLORINATION FURNACE

BACKGROUND OF THE INVENTION

1. Technical Field

This invention relates to a process for effectively removing harmful substances essentially consisting of inorganic and/or organic chlorides remaining in a waste gas exhausted from a chlorination furnace during the manufacture of titanium tetrachloride or zirconium tetrachloride.

2. Background Art

In general, titanium tetrachloride or zirconium tetrachloride is manufactured by heating raw materials such as a natural rutile, synthetic rutile, titanium slag, ilmenite, lucoxine, zircon sand, zirconium oxide and the like at a temperature of about 1,000° C. in the presence of a suitable reducing agent such as a petroleum coke in a chlorination furnace so that the metal oxides may be reacted with chlorine. A waste gas exhausted from the chlorination furnace during such process contains CO and a small amount of various chlorides in addition to a large quantity of $CO_2$. These chlorides consist of chlorides of various metals contained in the raw materials, and also chlorides of hydrogen, oxygen, carbon, sulfur and the like. In addition, when the reaction in the furnace is unsatisfactory, the waste gas sometimes contains unreacted free $Cl_2$ as well. Accordingly, such harmful substances as the chlorides remaining in the waste gas must be removed from the waste gas prior to its exhaustion to the atmosphere.

One of the purification processes conventionally used to remove such waste chlorides from the waste gas comprises the step of scrubbing the gas with water and/or alkaline solution. Such process consists in contacting the chlorides with water to hydrolyze most of the chlorides to HCl, hydroxide and acid chlorides, and has been widely practiced in industry.

However, this process is not satisfactory for reducing the concentration of chlorides remaining in the waste gas to a level of, for example, no more than 5 ppm in HCl equivalent according to the current regulation in Kanagawa prefecture, Japan. Furthermore, the scrubbing of waste gas with an alkaline solution produces carbonate which is hardly soluble in water and causes the cleaning apparatus to get clogged with the carbonate because the waste gas essentially consists of $CO_2$ and a further process is required to remove the carbonate therefrom for disposal.

In the manufacture of titanium tetrachloride, there is proposed a waste gas cleaning process which comprises the steps of adsorbing relatively larger quantities of titanium tetrachloride contained in the waste gas in an activated carbon and then scrubbing the waste gas with water and alkaline solution. However, this process is adapted mostly for the purpose of recovering titanium tetrachloride and is unsatisfactory in that the activated carbon rapidly becomes exhaused in its adsorption capacity owing to the existence of relatively larger quantities of titanium tetrachloride to be adsorbed, and it must be frequently subjected to a troublesome regeneration process. Furthermore, the concentration of chlorides remaining in the waste gas can only be reduced to a level equivalent to that in the conventional cleaning process using water and alkaline solution.

Accordingly, the present invention is intended to eliminate the above-mentioned disadvantages of the prior art. It is an object of the present invention to provide a process for the treatment of a waste gas from a chlorination furnace which is capable of remarkably reducing the content of chlorides remaining in the waste gas.

The inventors have conducted extensive research and experimentation in order to accomplish the above-mentioned object and have completed this invention based on such findings that adsorption capacity of activated carbon can be significantly increased so as to make it possible to reduce content of chlorides remaining in a waste gas to a level of no more than 5 ppm in HCl equivalent which is difficult to attain in a process of the prior art if moisture content of the waste gas after scrubbing with water is reduced to a level of no more than a predetermined level in view of the fact that the moisture content of the waste gas adversely affects the adsorption capacity of activated carbon, although the activated carbon can be used without decreasing the adsorption capacity for a relatively long period of time if the chlorides are removed from the waste gas as much as possible by scrubbing the same with water followed by adsorbing the chlorides remaining in a small amount in the waste gas in the activated carbon.

DISCLOSURE OF THE INVENTION

In accordance with the present invention, there is provided a process for the treatment of a waste gas from a chlorination furnace comprising the steps of throughly scrubbing the waste gas, which contains a large quantity of $CO_2$ and harmful substances, such as chlorides, and is exhausted from the chlorination furnace, with water, removing moisture from the waste gas to allow the waste gas to have a dew point of no more than 5° C., and subjecting the waste gas to an adsorption processing with an activated carbon.

The process according to the present invention is capable of effectively removing chlorides from the waste gas exhausted from the chlorination furnace which is an extremely difficult problem in the manufacture of titanium tetrachloride or zirconium tetrachloride and remarkably decreasing the content of chlorides in the waste gas down to a level of no more than 5 ppm in HCl equivalent. Furthermore, the process of the present invention has superior industrial and practical advantages and makes it possible to use an apparatus which is extremely simple in construction and safe in operation and also to use a treating agent repeatedly.

BEST MODE FOR CARRYING OUT THE INVENTION

In the process of the present invention, a waste gas which is exhausted from a chlorination furnace during the manufacture of titanium tetrachloride or zirconium tetrachloride is first throughly scrubbed with water. In the manufacture of titanium tetrachloride, the chlorides contained in the waste gas from the chlorination furnace consist essentially of metal chlorides such as $TiCl_4$, $SiCl_4$, $VOCl_3$, $POCl_2$, $SnCl_4$ and the like; hydrogen and/or oxygen containing chlorides such as HCl, $CH_2ClCOCl$, $CHCl_2COCl$ and the like; and, chlorides of carbon and sulfur such as $CCl_4$, $COCl_2$, $SCl_2$, $SOCl_2$ and the like. When manufacturing zirconium tetrachloride, a chlorination furnace exhausts a waste gas, the composition of which is substantially the same as that of the manufacture of titanium tetrachloride except that $TiCl_4$ is replaced with $ZrCl_4$. The waste gas in the manufacture of either TiCl$_4$ or ZrCl$_4$ sometimes contains free Cl$_2$ as explained above. The waste gas usually contains 1–5 mol % of such chlorides in HCl equivalent.

The scrubbing of waste gas with water may be carried out by means of a series of scrubbing columns preferably using the cleaning water which maintains an acidity not to allow solids to be deposited out even if it may be recycled. An outlet of the last stage of the scrubbing column is provided with a mist separator to collect mist. All of these apparatuses is preferably made of the acid-resistant materials. Acid water discharged during the cleaning operation is fed directly to a waste water treating apparatus for neutralization with an alkali. This cleaning process allows the content of chlorides in the waste gas which is existing as much as 1–5 mol % in HCl equivalent at an inlet of the water scrubbing column to reduce normally to a level of no more than 200 ppm, preferably, 50–100 ppm at its outlet.

The water cleaned waste gas is then subjected to the moisture adjustment so as to have a dew point of no more than 5° C. prior to effecting an adsorption processing with an activated carbon. The moisture adjustment is preferably carried out by means of a cold trap. The insufficient removal of the moisture from the water cleaned waste gas causes the dew point not to be kept at a temperature level of no more than 5° C. and this results in decreasing the adsorption capacity of the activated carbon in a short period of time in the subsequent adsorption processing. As a result, the ultimate concentration of the chlorides in the waste gas may not be reduced to a level of less than 5 ppm in HCl equivalent.

The waste gas after having been subjected to the moisture adjustment so as to have the dew point of 5° C. or less is then fed to an adsorption column having activated carbon layers so that the waste gas may be subjected to the adsorption treatment. Two adsorption columns are preferably provided so that either one of the columns may be used while regenerating the activated carbon in the other column when decreasing in its absorption capacity. The activated carbon is preferably charged in the column to have a layer thickness of 400–600 mm and the waste gas is evacuated at a rate of 0.3 m/sec or less. Under such conditions, the content of chlorides in the waste gas is reduced to a level of 1–2 ppm in HCl equivalent at the outlet of the column in which the activated carbon is packed, which makes it possible to effectively remove free Cl$_2$ which is contained in the waste gas due to the incomplete reaction in the chlorination furnace, if any, by adsorption.

The activated carbon rapidly decreases in its adsorption capacity when the total amount of adsorption reaches a predetermined level, and then the activated carbon must be regenerated. The regeneration cycle is usually two or three weeks, although it depends on the amount of the waste gas to be treated.

The activated carbon exhausted in its adsorption capacity can be easily regenerated by treating it with an aqueous alkali solution. The regeneration is accomplished by circulating an alkaline solution through the activated carbon packed in the column and passing an air through the column to dry the activated carbon at the time when the activated carbon is neutralized or alkalified. As the regeneration is repeated, the activated carbon decreases in quantity little by little. Therefore, a suitable amount of fresh activated carbon is replenished at every regeneration process. In addition, the repeated regeneration of the activated carbon results in gradually decrease in its durability of the adsorption capacity. Therefore, the activated carbon is periodically taken out for subjecting it to a heating treatment.

HCl contained in CO$_2$ is almost completely removed by scrubbing with water. However, it is well known that HCl is hard to adsorb in activated carbon. Accordingly, in the present invention, it is important to scrub the waste gas with water sufficiently to remove HCl as much as possible and then subject the waste gas to the adsorption process with activated carbon.

Any commercially available adsorbent for adsorbing an acid gas which is preferably of less pressure loss may be used as the activated carbon. Since the adsorption by the activated carbon utilizes the fine porous structure of the carbon, the cleaning of the activated carbon with the alkaline solution does not effect the regeneration of the carbon completely. Therefore, the activated carbon must be taken out of the column periodically for subjecting it to the heat treatment as explained above.

The present invention will be more fully explained with reference to the following examples.

EXAMPLE 1

Three rigid PVC pipes each having an inner diameter of 150 mm and a height of 1,000 mm in the center of which a plurality of porcelain raschig rings each having dimensions of 30 mm $\phi \times 30$ mm are packed to the thickness of approximately 500 mm were prepared. In the scrubbing column, water was sprayed at a rate of 200 l/min in the direction opposite to the flow of a waste gas. A gas cooling apparatus was provided which comprises a stainless steel double pipe of 800 mm in length consisting of an inner pipe of 100 mm in diameter and an outer pipe of 150 mm in diameter and having stainless steel swarf packed therein, and ethylene glycol of $-5°$ C. was flowed between the outer and inner tubes. A mist separator was prepared by using a rigid PVC pipe similar to the scrubbing column in which acrylic cotton is packed to the thickness of 700 mm. In addition, a column in which an activated carbon (particle size of 5 mm) is packed in the thickness of about 300 mm (weight of 2.4 kg) was prepared by using a rigid PCV pipe similar to that used for the scrubbing column. Each of the above scrubbing column, gas cooling apparatus, mist separator and activated carbon packed column was connected in that sequence by means of PVC hoses to constitute a waste gas treating apparatus. A waste gas exhausted from a chlorination furnace during the manufacture of titanium tetrachloride was passed through the apparatus.

The waste gas was evacuated by a blower connected to an outlet of the treating apparatus and permitted to flow within the apparatus at a rate of 0.3 m/sec. Natural rutile ore was used as the raw material. The waste gas contained 3 mol % (3,000 ppm) of chlorides in average in HCl equivalent including metal chlorides such as TiCl$_4$, SiCl$_4$, VOCl$_3$, POCl$_2$, SnCl$_4$ and the like, oxygen and/or hydrogen containing chlorides such as HCl, CH$_2$ClCOCl, CHCl$_2$COCl and the like, 55 mol % of CO$_2$; and 30 mol % of CO.

The waste gas was first cleaned in the three stages of the scrubbing columns with water, and then passed through the mist separator after subjecting the waste gas to cool at a temperature of $-2°$ C. by passing through the gas cooling apparatus. At an outlet of the mist separator, the content of the chlorides in the waste gas was 50 ppm in HCl equivalent. Thereafter, the waste gas was passed through the activated carbon packed column, which causes the content of chlorides in the waste gas to reduce to a level of 1-2 ppm in average in HCl equivalent at an outlet of the activated carbon packed column and no free $Cl_2$ was detected. In this experiment, about 2,000 $m^3$ of the waste gas was treated with 2.4 kg of the activated carbon.

COMPARISON EXAMPLE

A waste gas exhausted from a chlorination furnace during the manufacture of titanium tetrachloride which was equivalent to that of Example 1 was sufficiently cleaned in a water scrubbing column divided into ten stages. Then, the waste gas was cleaned with an aqueous calcium hydroxide solution followed by an aqueous sodium hydroxide solution. After cleaning the waste gas with sodium chloride, the content of the chloride in the waste gas was 10 ppm in HCl equivalent.

EXAMPLE 2

A waste gas exhausted from a chlorination furnace during the manufacture of zirconium tetrachloride using zircon sand as the raw material was treated by employing the same apparatus and process as in Example 1. The waste gas contained 1.5 mol % (15,000 ppm) of chlorides in HCl equivalent including metal chlorides such as $ZrCl_4$, $SiCl_4$, $POCl_2$ and the like, and hydrogen and/or oxygen containing chlorides such as HCl, $CH_2ClOCl$, $CHCl_2COCl$, $COCl_2$ and the like, 35 mol % of $CO_2$, and 65 mol % of CO. The content of the chlorides in the waste gas was 1-2 ppm in average in HCl equivalent at the outlet of the activated carbon packed column and no free $Cl_2$ was detected.

INDUSTRIAL APPLICABILITY

As apparent from the foregoing, the process of the present invention is extremely suitable for use in industry as a process for treating a waste gas exhausted during the manufacture of titanium tetrachloride or zirconium tetrachloride.

We claim:

1. A process for the treatment of a waste gas exhausted from a chlorination furnace during the manufacture of titanium tetrachloride comprising:
   (a) scrubbing said waste gas with water to substantially reduce the concentration of chlorides in said waste gas,
   (b) removing sufficient moisture from said scrubbed waste gas to obtain a dew point thereof of no more than 5° C., and
   (c) substantially removing harmful substances consisting essentially of titanium tetrachloride from the demoisturized waste gas with activated carbon.

2. The process for the treatment of a waste gas exhausted from a chlorination furnace as defined in claim 1, wherein said scrubbing of said waste gas with water, said removal of the moisture from said waste gas and said adsorption process of said waste gas with said activated carbon are effected by flowing said waste gas into a waste gas treating apparatus comprising a water scrubbing column, a gas cooling apparatus, a mist separator and an activated carbon packed column at a rate of 0.3 m/sec.

3. The process for the treatment of a waste gas exhausted from a chlorination furnace as defined in claim 1, wherein said removal of the moisture from said waste gas is effected by using a cold trap.

4. The process for the treatment of a waste gas exhausted from a chlorination furnace as defined in claim 1, wherein said scrubbed waste gas after step (a) contains chlorides in an amount not greater than 200 ppm in HCl equivalent.

5. The process of claim 2 wherein the scrubbed waste gas after step (a) contains chlorides in an amount between 50 to 100 ppm in HCl equivalents.

6. The process of claim 2 wherein the waste gas after step (c) contains chlorides in an amount not greater than 5 ppm in HCl equivalent.

7. The process of claim 6 wherein the chloride content is about 1-2 ppm in HCl equivalent.

8. A process for the treatment of a waste gas exhausted from a chlorination furnace during the manufacture of zirconium tetrachloride comprising:
   (a) scrubbing said waste gas with water to substantially reduce the concentration of chlorides in said waste gas,
   (b) removing sufficient moisture from said scrubbed waste gas to obtain a dew point thereof of no more than 5° C., and
   (c) substantially removing harmful substances consisting essentially of zirconium tetrachloride from the demoisturized waste gas with activated carbon.

9. The process for the treatment of a waste gas exhausted from a chlorination furnace as defined in claim 8, wherein the scrubbing of said waste gas with water, the removal of the moisture from said waste gas and the adsorption process of said waste gas with said activated carbon are effected by flowing said waste gas into a waste gas treating apparatus comprising a water scrubbing column, a gas cooling apparatus, a mist separator and an activated carbon packed column at a rate of 0.3 m/sec.

10. The process for the treatment of a waste gas exhausted from a chlorination furnace as defined in claim 8, wherein said removal of the moisture from said waste gas is effected by using a cold trap.

11. The process for the treatment of a waste gas exhausted from a chlorination furnace as defined in claim 8, wherein said scrubbed waste gas after step (a) contains chlorides in an amount not greater than 200 ppm in HCl equivalent.

12. The process of claim 11 wherein the scrubbed waste gas after step (a) contains chlorides in an amount between 50 to 100 ppm in HCl equivalents.

13. The process of claim 11 wherein the waste gas after step (c) contains chlorides in an amount not greater than 5 ppm in HCl equivalent.

14. The process of claim 13 wherein the chloride content is about 1-2 ppm in HCl equivalent.

* * * * *